(12) United States Patent
Chetrit et al.

(10) Patent No.: US 10,564,353 B2
(45) Date of Patent: Feb. 18, 2020

(54) WAVEGUIDE TRANSITION STRUCTURE AND FABRICATION METHOD

(71) Applicant: Intel Corporation, Santa Clara, CA (US)

(72) Inventors: Yoel Chetrit, Kfar Ben Non (IL); Judson D. Ryckman, Dayton, CA (US); Jeffrey B. Driscoll, Santa Clara, CA (US); Harel Frish, Qiryat Gat (IL); Ling Liao, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/036,483

(22) Filed: Jul. 16, 2018

(65) Prior Publication Data

US 2019/0025512 A1    Jan. 24, 2019

Related U.S. Application Data

(63) Continuation of application No. 15/393,696, filed on Dec. 29, 2016, now Pat. No. 10,054,740.

(51) Int. Cl.
| | |
|---|---|
| *G02B 6/12* | (2006.01) |
| *G02B 6/122* | (2006.01) |
| *G02B 6/136* | (2006.01) |
| *H01P 3/16* | (2006.01) |
| *H01P 11/00* | (2006.01) |

(52) U.S. Cl.
CPC ....... *G02B 6/1228* (2013.01); *G02B 6/12002* (2013.01); *G02B 6/136* (2013.01); *H01P 3/16* (2013.01); *H01P 11/006* (2013.01); *G02B 2006/12038* (2013.01)

(58) Field of Classification Search
USPC .......................................................... 385/14
See application file for complete search history.

(56) References Cited

U.S. PATENT DOCUMENTS

| | | | |
|---|---|---|---|
| 6,174,748 B1 * | 1/2001 | Jeon ..................... | G02B 6/1228 372/45.01 |
| 7,079,727 B1 * | 7/2006 | Little .................. | G02B 6/1228 385/130 |
| 9,170,374 B2 | 10/2015 | Chen et al. | |
| 9,329,344 B2 * | 5/2016 | Anderson ................ | G02B 6/27 |

(Continued)

OTHER PUBLICATIONS

International Search Report and Written Opinion dated Mar. 13, 2018 for International Application No. PCT/US2017/063652, 17 pages.

(Continued)

*Primary Examiner* — Eric Wong
(74) *Attorney, Agent, or Firm* — Schwabe, Williamson & Wyatt, P.C.

(57) ABSTRACT

Some embodiments of the present disclosure describe a tapered waveguide and a method of making the tapered waveguide, wherein the tapered waveguide comprises a first and a second waveguide, wherein the first and second waveguides overlap in a waveguide overlap area. The first and second waveguides have a different size in at least one dimension perpendicular to an intended direction of propagation of electromagnetic radiation through the tapered waveguide. Across the waveguide overlap area, one of the waveguides gradually transitions or tapers into the other.

20 Claims, 11 Drawing Sheets

(56) References Cited

U.S. PATENT DOCUMENTS

| | | |
|---|---|---|
| 9,500,807 B2 | 11/2016 | Oka |
| 2003/0044118 A1* | 3/2003 | Zhou .................... G02B 6/1228 385/43 |
| 2003/0210725 A1 | 11/2003 | Prassas et al. |
| 2004/0042752 A1 | 3/2004 | Lee et al. |
| 2005/0185893 A1 | 8/2005 | Liu |
| 2006/0183625 A1* | 8/2006 | Miyahara .............. C04B 35/053 501/98.4 |
| 2008/0044126 A1 | 2/2008 | Costa et al. |
| 2010/0086255 A1* | 4/2010 | Ishizaka ............... G02B 6/1228 385/31 |
| 2011/0170825 A1 | 7/2011 | Spector et al. |
| 2012/0224813 A1 | 9/2012 | Chen et al. |
| 2013/0170793 A1* | 7/2013 | Ushida ................. G02B 6/1228 385/43 |
| 2014/0199018 A1 | 7/2014 | Sakakibara et al. |
| 2016/0131842 A1 | 5/2016 | Mahgerefteh et al. |

OTHER PUBLICATIONS

Non-Final Office Action dated Jul. 3, 2017 for U.S. Appl. No. 15/393,696, 7 pages.

Final Office Action dated Jan. 22, 2018 for U.S. Appl. No. 15/393,696, 8 pages.

Notice of Allowance dated Apr. 13, 2018 for U.S. Appl. No. 15/393,696, 12 pages.

Notice of Allowance dated May 7, 2018 for U.S. Appl. No. 15/393,696, 8 pages.

\* cited by examiner

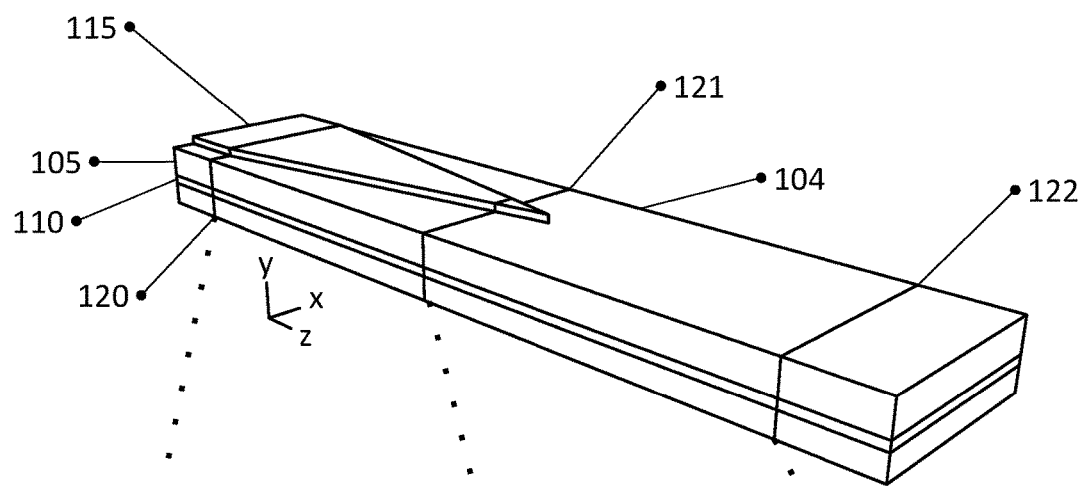
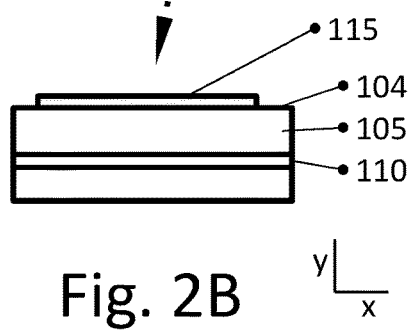 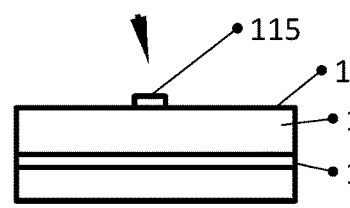 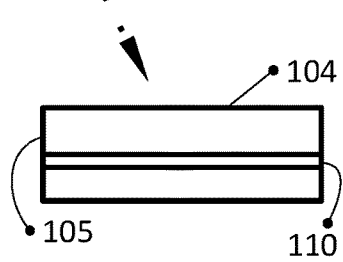
Fig. 2A
Fig. 2B   Fig. 2C   Fig. 2D

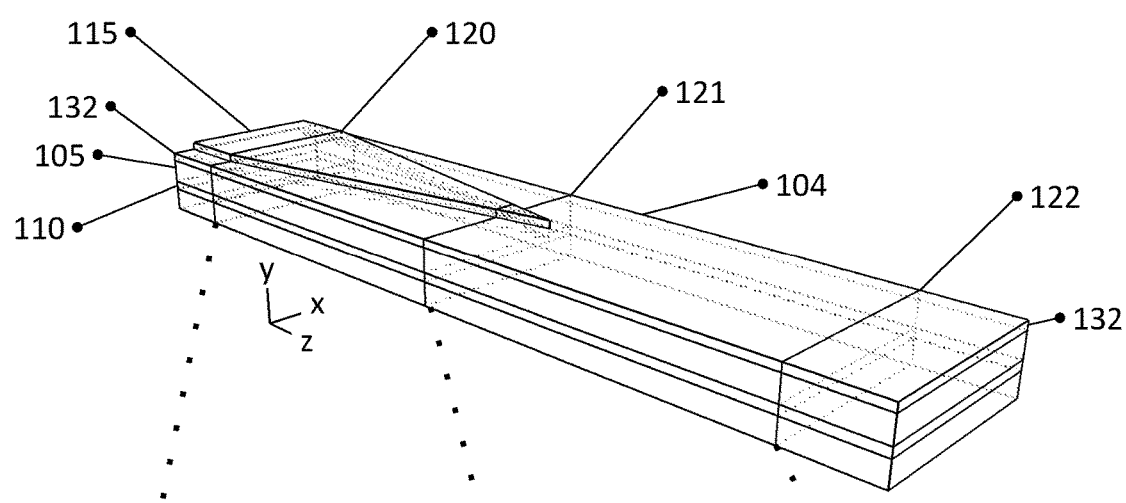
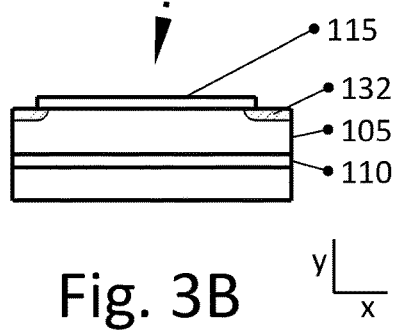 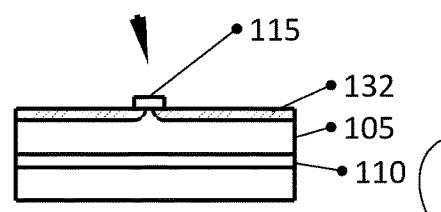 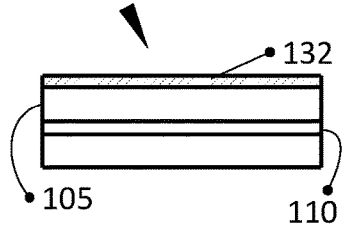
Fig. 3A
Fig. 3B    Fig. 3C    Fig. 3D

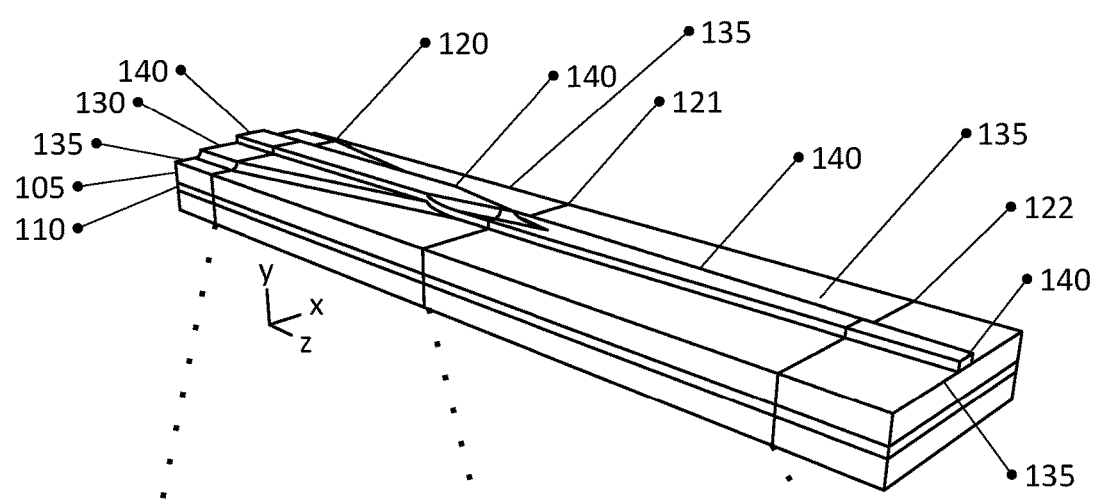
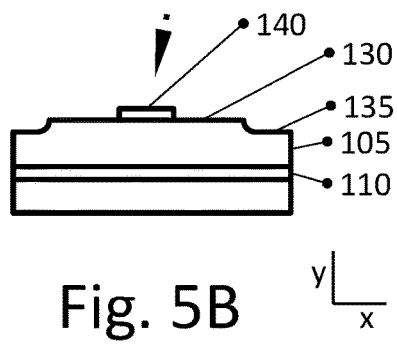
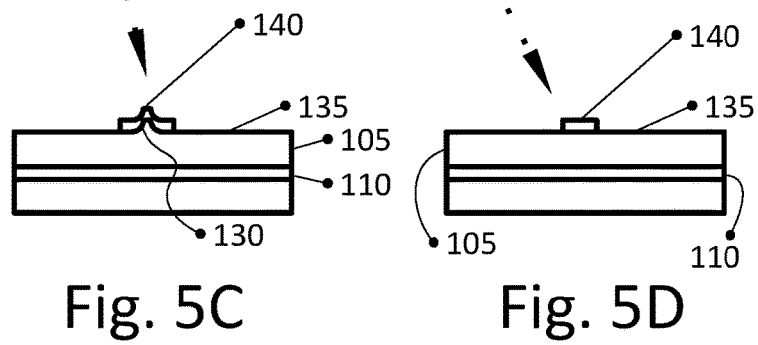
Fig. 5A
Fig. 5B
Fig. 5C
Fig. 5D

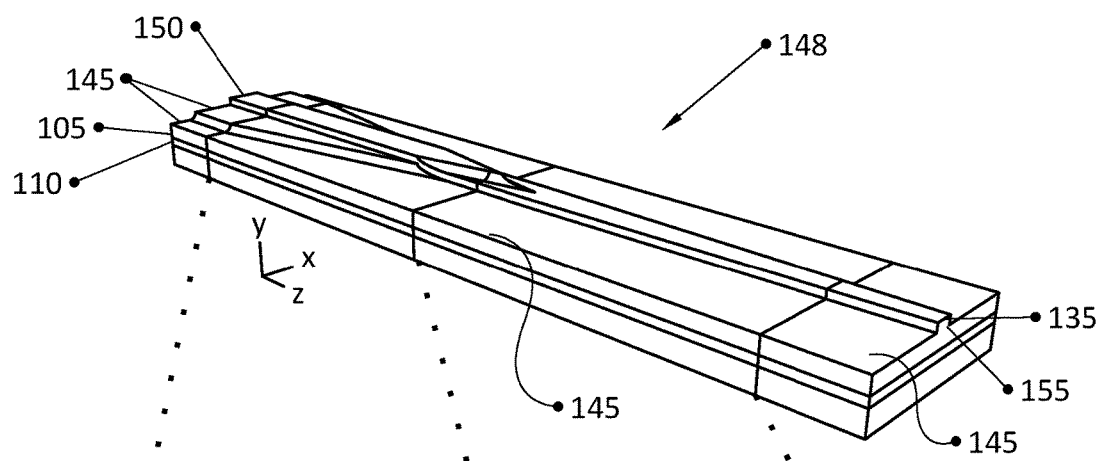
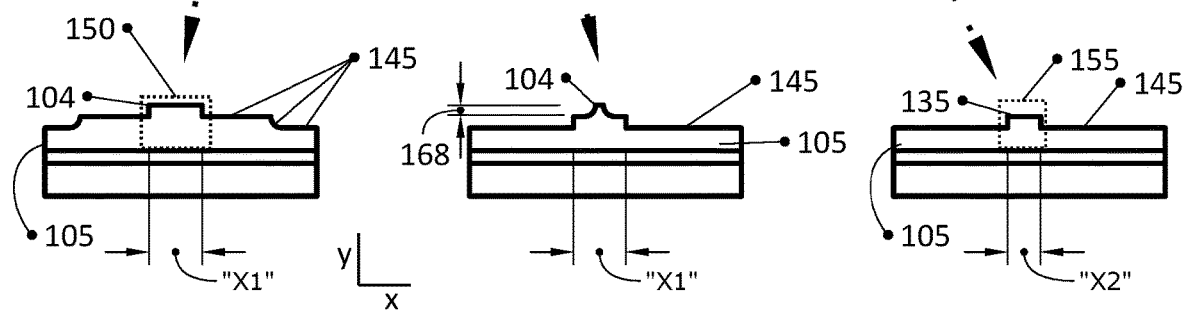
Fig. 7A
Fig. 7B  Fig. 7C  Fig. 7D

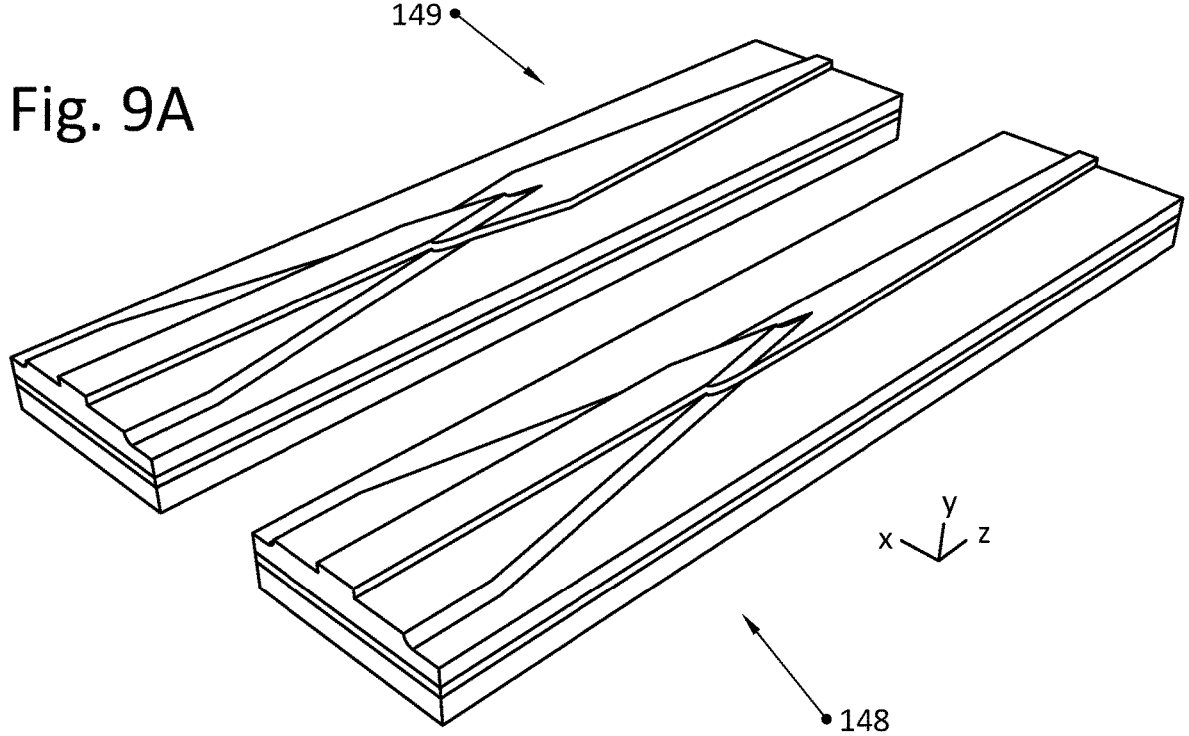

WAVEGUIDE TRANSITION STRUCTURE AND FABRICATION METHOD

CROSS REFERENCE TO RELATED APPLICATION

This application is a continuation of U.S. patent application Ser. No. 15/393,696, entitled "WAVEGUIDE TRANSITION STRUCTURE AND FABRICATION METHOD," filed on Dec. 29, 2016, and claims priority to the Ser. No. 15/393,696 application. The entire disclosure of the Ser. No. 15/393,696 application is incorporated herein by reference.

FIELD

Embodiments of the present disclosure generally relate to the field of interconnection structures, and more particularly, to a waveguide structure for electromagnetic radiation in a silicon photonics optical circuit.

BACKGROUND

Semiconductor and other devices now may include photonic devices to generate, guide, split, combine, focus, or detect electromagnetic radiation; detection of electromagnetic radiation may involve conversion of electromagnetic radiation into an electrical charge or current.

Some silicon and semiconductor devices may include more than one such photonic device. Photonic devices may be of different physical sizes, often determined by optical or other functional properties. In some silicon and semiconductor devices, a waveguide may optically couple a first photonic device of a first size to a second photonic device of a second size. A waveguide with a continuous size between the photonic devices may be chosen, notwithstanding that the waveguide optically couples photonic devices of different sizes. The continuous size may be a compromise relative to one or both of the photonic devices. This compromise may result in losses, such as insertion, transition, and back reflection losses. A waveguide with a 3-dimensional ("3D") taper between the photonic devices may act as a more efficient waveguide, relative to a waveguide with a continuous size. However, fabrication of a waveguide with a 3D taper has involved demanding fabrication processes, such as gray scale lithography and selective epitaxial growth.

Semiconductor and silicon devices often are subject to imperatives to reduce size, fabrication steps, fabrication cost, and to improve fabrication reliability (also referred to as a "yield rate" for a fabrication process). Optimizing this set of demands is complex and costly.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings. As submitted, certain of the drawings place components in a same location and with a same view on successive pages; thus, it may be possible to view successive pages which, together, graphically illustrate a result of fabrication steps.

FIG. 2A illustrates the perspective isometric view of the slab of silicon of FIG. 1, further comprising an oxidation mask, in accordance with some embodiments.

FIG. 2B illustrates an elevation view of a first cross-section of the slab of silicon and oxidation mask of FIG. 2A, in accordance with some embodiments.

FIG. 2C illustrates an elevation view of a second cross-section of the slab of silicon and oxidation mask of FIG. 2A, in accordance with some embodiments.

FIG. 2D illustrates an elevation view of a third cross-section of the slab of silicon and oxidation mask of FIG. 2A, in accordance with some embodiments.

FIG. 3A illustrates the perspective isometric view of the slab of silicon and oxidation mask of FIG. 2A, following oxidation and with partial transparency to show an oxidation layer, in accordance with some embodiments.

FIG. 3B illustrates an elevation view of the first cross-section of the slab of silicon, oxidation mask, and oxidation layer of FIG. 3A, in accordance with some embodiments.

FIG. 3C illustrates an elevation view of the second cross-section of the slab of silicon, oxidation mask, and oxidation layer of FIG. 3A, in accordance with some embodiments.

FIG. 3D illustrates an elevation view of the third cross-section of the slab of silicon, oxidation mask, and oxidation layer of FIG. 3A, in accordance with some embodiments.

FIG. 5A illustrates the perspective isometric view of the slab of silicon of FIG. 4A, following application of a second mask, in accordance with some embodiments.

FIG. 5B illustrates an elevation view of the first cross-section of the slab of silicon and second mask of FIG. 5A, in accordance with some embodiments.

FIG. 5C illustrates an elevation view of the second cross-section of the slab of silicon and second mask of FIG. 5A, in accordance with some embodiments.

FIG. 5D illustrates an elevation view of the third cross-section of the slab of silicon and second mask of FIG. 5A, in accordance with some embodiments.

FIG. 7A illustrates the perspective isometric view of the slab of silicon of FIG. 6A, following removal of the second mask, in accordance with some embodiments.

FIG. 7B illustrates an elevation view of the first cross-section of the slab of silicon of FIG. 7A, in accordance with some embodiments.

FIG. 7C illustrates an elevation view of the second cross-section of the slab of silicon of FIG. 7A, in accordance with some embodiments.

FIG. 7D illustrates an elevation view of the third cross-section of the slab of silicon of FIG. 7A, in accordance with some embodiments.

FIG. 9A illustrates a perspective view of the first embodiment of the waveguide structure FIG. 8A.

FIG. 9B illustrates a perspective view of the second embodiment of the waveguide structure FIG. 8B.

DETAILED DESCRIPTION

Figure 1:
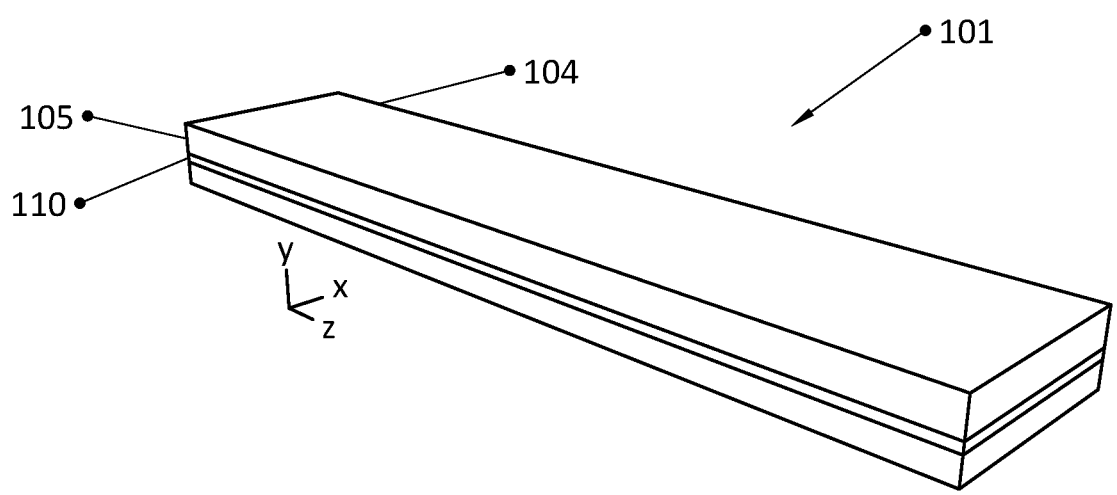
FIG. 1 illustrates a perspective isometric view of an example of a slab of silicon comprising an epitaxial film and a layer of silicon dioxide, in accordance with some embodiments.

Some embodiments of the present disclosure describe a waveguide structure comprising a 3D taper and a method of fabricating such structure. In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation relative to an acceleration field.

The description may use the phrases "in an embodiment," or "in embodiments," or "in some embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in physical or electrical contact and/or that two or more elements are optically coupled. An optical couple may comprise a gap; the gap comprise a vacuum or be filled with air, a liquid, a transmissive solid, or the like. "Coupled" may also mean that two or more elements indirectly contact each other, but yet still cooperate or interact with each other. As used herein, "optical" and formatives should not be understood to be limited to visible electromagnetic radiation, but should be understood to include any electromagnetic radiation.

FIG. 1 illustrates a perspective isometric view of an example of slab of silicon, also referred to herein as "slab 101". Slab 101 may comprise epitaxial film 105 and a layer of silicon dioxide 110. Epitaxial film 105 may be an epitaxial film grown, for example, on a substrate from a gaseous or liquid precursor. Epitaxial film 105 may have a crystalline structure perpendicular to an intended axis of propagation of electromagnetic radiation through epitaxial film 105. Illustrated in FIGS. 1-7D are axis x, y, and z. These axes are illustrated for the sake of convenience. An intended axis of propagation of electromagnetic radiation through epitaxial film 105 may be in the along the z axis. An original top of epitaxial film 105 is also referred to herein as "original level 104". As used herein, "silicon" represents any epitaxial crystal. Silicon dioxide 110 may be formed in silicon slab 105; silicon slab 105 may be formed on silicon dioxide 110. Silicon, silicon dioxide, or another material may be beneath silicon dioxide 110 ("beneath" relative to the y axis).

FIG. 2A illustrates the perspective isometric view of epitaxial film 105 and silicon dioxide 110 of FIG. 1, further comprising oxidation mask 115, in accordance with some embodiments. Oxidation mask 115 may be on a top of or above epitaxial film 105, on original level 104 of epitaxial film 105. The composition of oxidation mask 115 may be, for example, silicon nitride, a rigid mask, or the like. Oxidation mask 115 may taper from one end to another, along the z axis. In FIG. 2A are lines at first cross-section 120, second cross-section 121, and third cross-section 122. These lines are not present in the structure, but merely indicate cross-sections illustrated further in FIGS. 2B-2D.

FIG. 2B illustrates an elevation view of first cross-section 120 of oxidation mask 115, epitaxial film 105, and oxidation mask 110 of FIG. 2A, in accordance with some embodiments. As discussed, a top of epitaxial film 105 is at original level 104 (also labeled in FIGS. 2C and 2D).

FIG. 2C illustrates an elevation view of second cross-section 121 of oxidation mask 115 and epitaxial film 105 of FIG. 2A, in accordance with some embodiments. FIGS. 2B and 2C provide an internal view of oxidation mask 115, a position of oxidation mask 110 on epitaxial film 105, and illustrate that oxidation mask 115 tapers.

FIG. 2D illustrates an elevation view of third cross-section 122 of epitaxial film 105 of FIG. 2A, in accordance with some embodiments. As illustrated, oxidation mask 115 has tapered such that it is no longer present on epitaxial film 105 at third cross-section 122.

Figure 11:
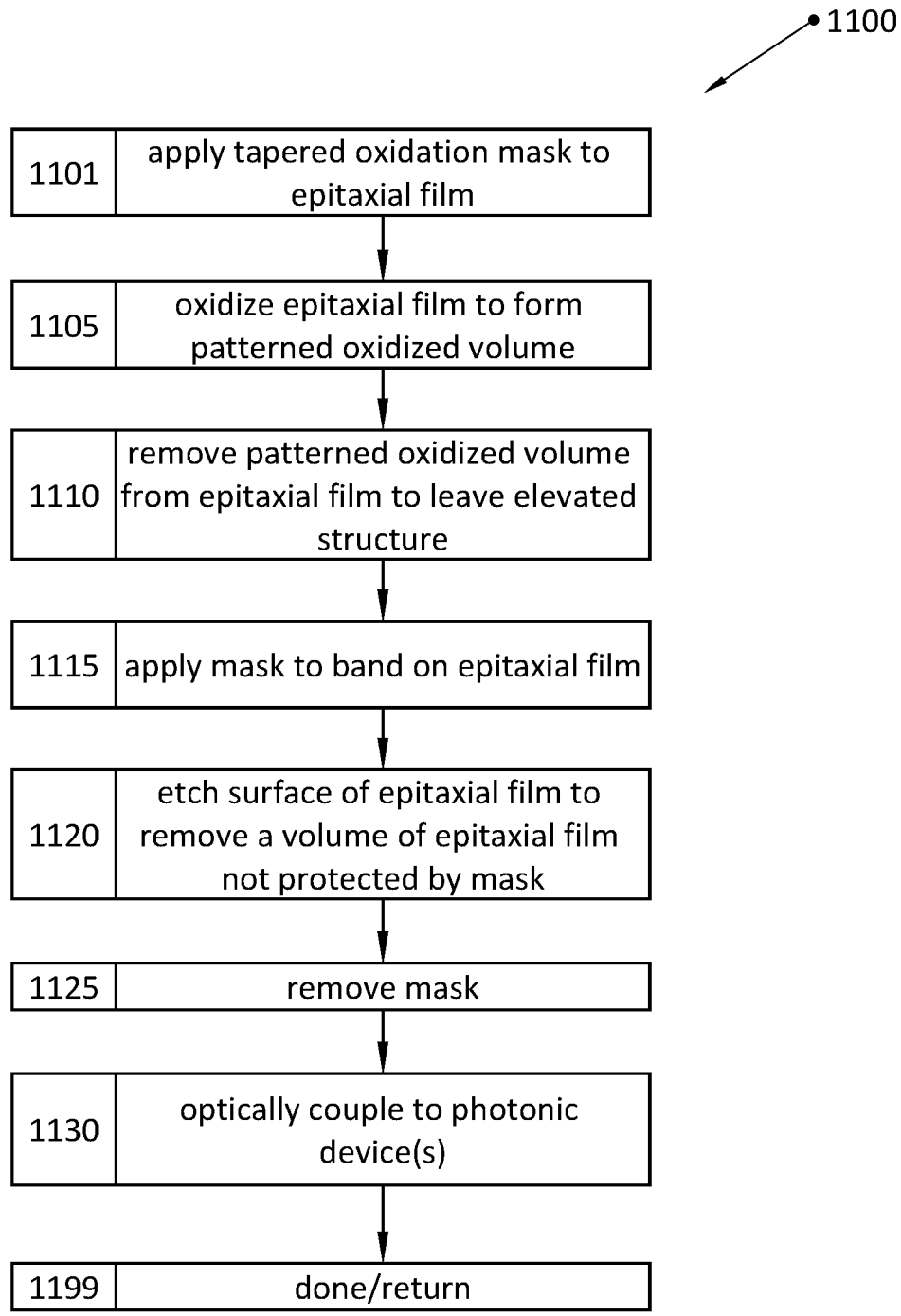
FIG. 11 is a flow diagram illustrating an example of a process to fabricate a waveguide, according to some embodiments.

With respect to FIG. 11, oxidation mask 115 may be formed on, applied to, and/or positioned above epitaxial film 105 at block 1101.

FIG. 3A illustrates the perspective isometric view of epitaxial film 105 and oxidation mask 115 of FIG. 2A, following oxidation and illustrated with partial transparency to show oxidation layer 132, in accordance with some embodiments. Oxidation layer 132 may penetrate into epitaxial film 105. Oxidation layer 132 may penetrate below and beneath oxidation mask 115, as may be seen in FIGS. 3B and 3C. Not shown, oxidation layer may extend up from an original surface of epitaxial film 105, prior to oxidation. Oxidation layer 132 may be formed, for example, by thermal oxidation, including wet and dry processes.

FIG. 3B illustrates an elevation view of first cross-section 120 of oxidation mask 115, epitaxial film 105, and oxidation layer 132 of FIG. 3A, in accordance with some embodiments. As illustrated in FIGS. 3B and 3C and as noted, oxidation layer 132 may penetrate below and beneath oxidation mask 115.

FIG. 3C illustrates an elevation view of second cross-section 121 of oxidation mask 115, epitaxial film 105, and oxidation layer 132 of FIG. 3A, in accordance with some embodiments.

FIG. 3D illustrates an elevation view of third cross-section 122 of epitaxial film 105 and oxidation layer 132 of FIG. 3A, in accordance with some embodiments.

With respect to FIG. 11, oxidation layer 132 may be formed at block 1105.

Figure 4A:
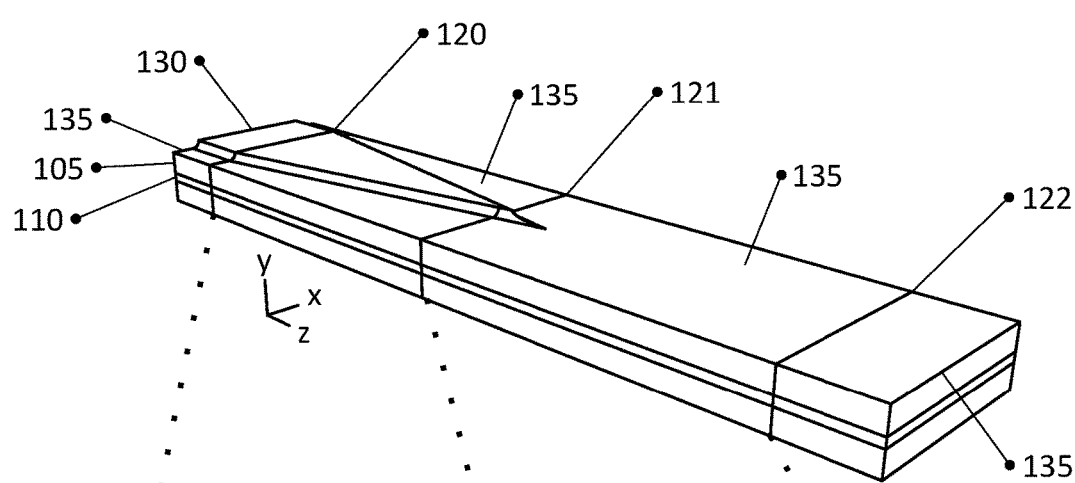
FIG. 4A illustrates the perspective isometric view of the slab of silicon of FIG. 3A, following removal of oxidation mask and oxidation layer, in accordance with some embodiments.

FIG. 4A illustrates the perspective isometric view of epitaxial film 105 of FIG. 3A, following removal of oxidation mask 115 and oxidation layer 132, leaving elevated structure 130 with a top (relative to the y axis) at original level 104, in accordance with some embodiments. Elevated structure 130 may taper along the z axis, following an outline of tapered oxidation mask 115. Sides of elevated structure 130 may be beveled, with a leading nose of tapered elevated structure 130 tapering to a second top of epitaxial film 105, following removal of oxidation layer 132. The second top of epitaxial film 105 following removal of oxidation layer 132 is also referred to herein as "first etch level 135". Oxidation mask 115 and oxidation layer 132 may be removed by a process such as, for example, a wet etch process. The wet etch process may be isotropic, such as a wet etch with buffered hydrofluoric acid ("BHF").

Figure 4B:
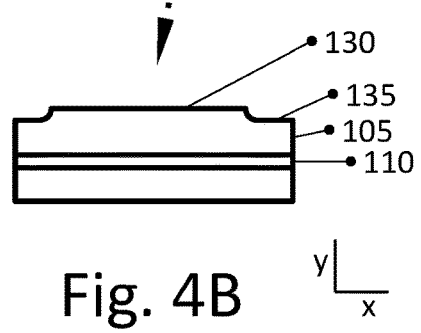
FIG. 4B illustrates an elevation view of the first cross-section of the slab of silicon of FIG. 4A, in accordance with some embodiments.

FIG. 4B illustrates an elevation view of first cross-section 120 of epitaxial film 105 of FIG. 4A, in accordance with some embodiments. As noted, sides of elevated structure 130 to first etch level 135 may be beveled by, for example, the process of removing oxidation mask 115 and oxidation layer 132. Paging between FIGS. 2B, 3B, and 4B illustrates that a top of elevated structure 130 is at original level 104, while first etch level 135 is at a lower level, relative to original level 104.

Figure 4C:
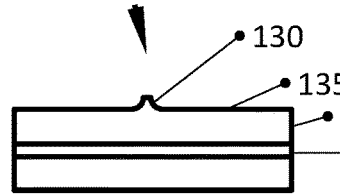
FIG. 4C illustrates an elevation view of the second cross-section of the slab of silicon of FIG. 4A, in accordance with some embodiments.

FIG. 4C illustrates an elevation view of second cross-section 121 of epitaxial film 105, elevated structure 130, and first etch level 135 of FIG. 4A, in accordance with some embodiments. In FIG. 4C, the cross-section of elevated structure 130 has a significantly narrower width, due to the taper of elevated structure 130.

Figure 4D:
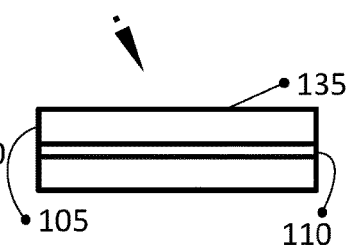
FIG. 4D illustrates an elevation view of the third cross-section of the slab of silicon of FIG. 4A, in accordance with some embodiments.

FIG. 4D illustrates an elevation view of third cross-section 122 of epitaxial film 105 and first etch level 135 of FIG. 4A, in accordance with some embodiments.

With respect to FIG. 11, oxidation mask 115 and oxidation layer 132 may be removed at block 1110.

FIG. 5A illustrates the perspective isometric view of epitaxial film 105 of FIG. 4A, following application of a second mask 140 to a band along the surface of epitaxial film 105 of FIG. 4A along the z axis, in accordance with some embodiments. The band of second mask 140 is covering and protecting a portion of elevated structure 130, protecting a corresponding portion of original level 104. The band of second mask 140 is also covering and protecting a portion of first etch level 135. Second mask 140 may be, for example, a photolithographic mask.

FIG. 5B illustrates an elevation view of first cross-section 120 of epitaxial film 105 and second mask 140 of FIG. 5A, in accordance with some embodiments.

FIG. 5C illustrates an elevation view of second cross-section 121 of epitaxial film 105 and second mask 140 of FIG. 5A, in accordance with some embodiments. FIGS. 5A, 5B, and 5C illustrate that band of second mask 140 lays atop a portion of elevated structure 130 and a portion of first etch level 135.

FIG. 5D illustrates an elevation view of third cross-section 122 of epitaxial film 105 and second mask 140 of FIG. 5A, in accordance with some embodiments. FIG. 5D illustrates that, at third cross-section 122, band of second mask 140 lays atop a portion of first etch level 135.

With respect to FIG. 11, application of second mask 140 may occur at block 1115.

Figure 6A:
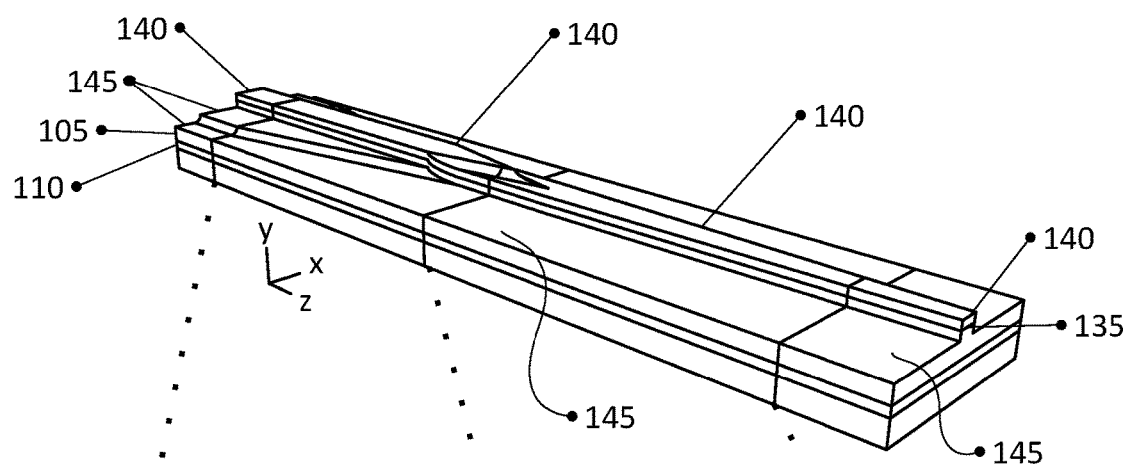
FIG. 6A illustrates the perspective isometric view of the slab of silicon and second mask of FIG. 5A, following an etch process, in accordance with some embodiments.

FIG. 6A illustrates the perspective isometric view of epitaxial film 105 and second mask 140 of FIG. 5A, following an etch process, in accordance with some embodiments. The etch process of FIG. 6A may be a dry etch or plasma-phase process, also referred to as plasma etching or a plasma etch process. The dry etch may be anisotropic. For example, material may be preferentially removed along the y axis. In an alternative embodiment, an anisotropic wet etch process may be used. Examples of anisotropic wet etch processes include processes using ethylenediamine pyrocatechol, potassium hydroxide/isopropal alcohol, and/or tetramethylammonium hydroxide. The post-etch level of epitaxial film is referred to herein as "second etch level 145".

Figure 6B:
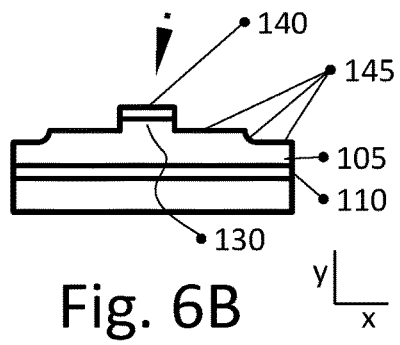
FIG. 6B illustrates an elevation view of the first cross-section of the slab of silicon and second mask of FIG. 6A, in accordance with some embodiments.

FIG. 6B illustrates an elevation view of first cross-section 120 of epitaxial film 105, second mask 140, and second etch level 145 of FIG. 6A, in accordance with some embodiments.

Figure 6C:
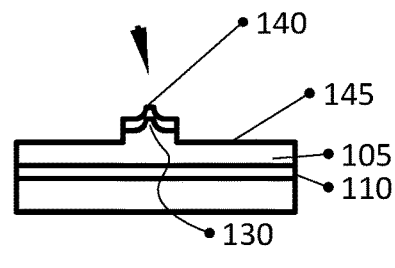
FIG. 6C illustrates an elevation view of the second cross-section of the slab of silicon and second mask of FIG. 6A, in accordance with some embodiments.

FIG. 6C illustrates an elevation view of second cross-section 121 of epitaxial film 105, second mask 140, and second etch level 145 of FIG. 6A, in accordance with some embodiments. FIGS. 6B and 6C label a portion of elevated structure 130, protected by second mask 140.

Figure 6D:
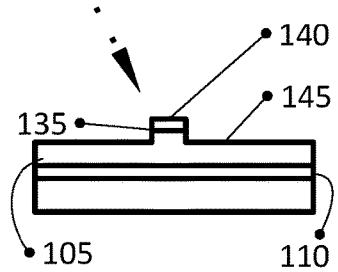
FIG. 6D illustrates an elevation view of the third cross-section of the slab of silicon and second mask of FIG. 6A, in accordance with some embodiments.

FIG. 6D illustrates an elevation view of third cross-section 122 of epitaxial film 105, second mask 140, and second etch level 145 of FIG. 6A, in accordance with some embodiments. FIG. 6D labels first etch level 135, beneath second mask 140. Paging between FIGS. 5B-5D and 6B-6D illustrates material removed anisotropically by the dry etch process.

With respect to FIG. 11, the plasma or dry anisotropic etch may be performed at block 1120.

FIGS. 7A-7D are described together. FIG. 7A illustrates the perspective isometric view of epitaxial film 105 of FIG. 6A, following removal of second mask 140, in accordance with some embodiments. FIG. 7B illustrates an elevation view of first cross-section 120 of epitaxial film 105 of FIG. 7A, in accordance with some embodiments. FIG. 7C illustrates an elevation view of second cross-section 121 of epitaxial film 105 of FIG. 7A, in accordance with some embodiments. FIG. 7D illustrates an elevation view of third cross-section 122 of the epitaxial film 105 of FIG. 7A, in accordance with some embodiments.

Illustrated in FIGS. 7A-7D are first waveguide 150 and second waveguide 155, illustrated within dotted line profiles in FIGS. 7B and 7D. First waveguide 150 generally spans the y axis from original level 104 to silicon dioxide 110. A top of first waveguide 150 on the y axis is at original level 104. A top of second waveguide 155 on the y axis is at first etch level 135, which is below original level 104. A portion of first waveguide 150 which is above the level of the first etch level 135 is referred to herein as "first waveguide top plain 168", a portion of which is labeled in FIG. 7C (first waveguide top plain 168 is also visible, though not labeled, in FIG. 7B). First waveguide top plain 168 tapers from an x axis width of "X1" to zero across a waveguide overlap area (the waveguide overlap area being labeled and discussed in relation to FIG. 8B).

As discussed above, a portion of second waveguide 155 is encircled within a dotted line in FIG. 7D. Second waveguide 155 generally spans, in the y axis, from first etch level 135, which, as noted, is lower than original level 104, to oxidation layer 110. At a terminus of tapered waveguide 148 along the x axis, second waveguide 155 is narrower in width along the x axis than X1, second waveguide 155 having tapered from width X2 to X1 between a waveguide overlap area (identified in FIG. 8B) and the terminus of tapered waveguide 148 along the x axis. This taper from X1 to X2 in second waveguide 155 is not necessary, but is illustrated as an embodiment. At its terminus, second waveguide 155 may have the same width, X1, as top plain of first waveguide 168, or may have a wider width. A top of second waveguide 155, at first etch level 135, is also discussed herein as "second waveguide top plain". Second waveguide top plain is discussed herein as being "adjacent" to first waveguide top plain 168. A tapered waveguide may also be referred to herein as a waveguide transition structure.

A gradual 3D taper with a complex shape is achieved between first waveguide top plain 168 and a width of the second waveguide, without use of demanding fabrication techniques, such as gray scale lithography or selective epitaxial growth. This gradual 3D taper achieves low losses in transmitting electromagnetic radiation between first waveguide 150 and waveguide 155.

With respect to FIG. 11, removal of second mask 140, resulting in tapered waveguide 148, may occur, for example, at block 1125.

Figure 8A:
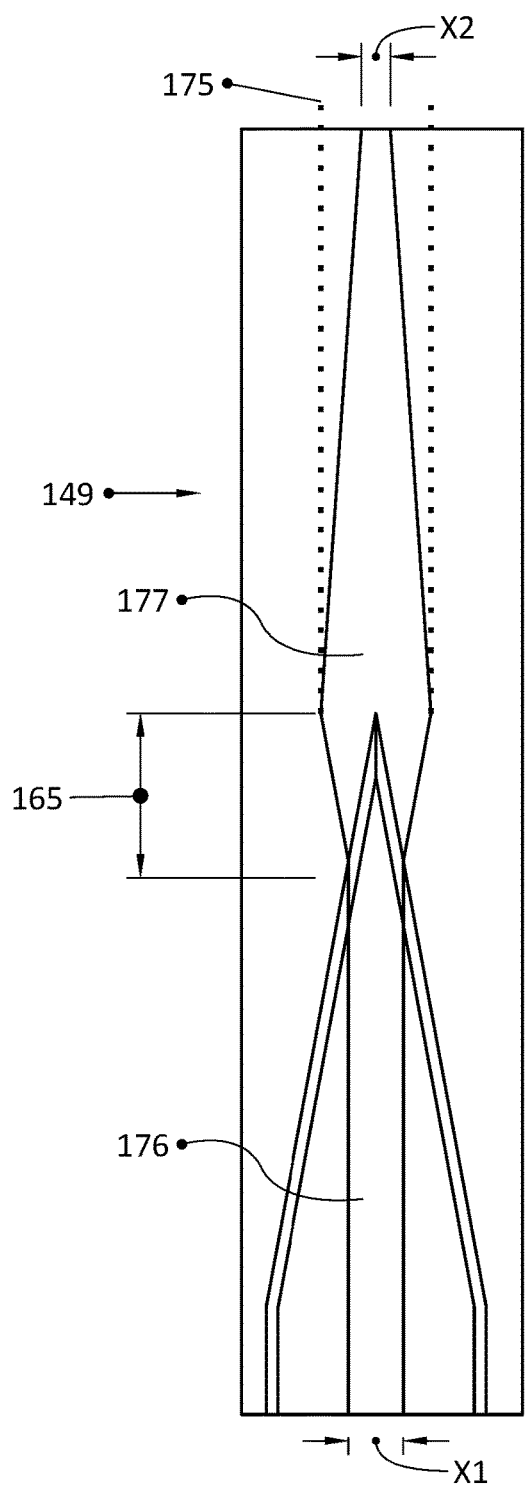
FIG. 8A illustrates a parallel projection plan view of a first embodiment of a waveguide structure prepared according to disclosure herein.
Figure 8B:
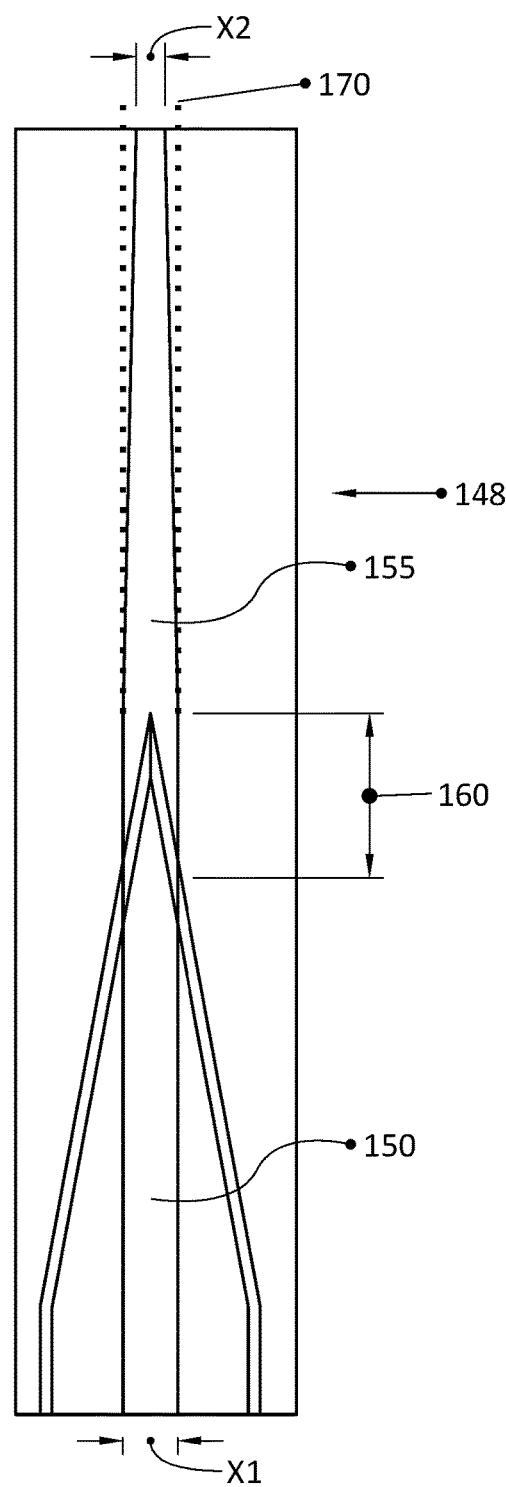
FIG. 8B illustrates a parallel projection plan view of a second embodiment of a waveguide structure prepared according to disclosure herein.

FIG. 8A illustrates a parallel projection plan view of an embodiment of a tapered waveguide structure 149 prepared according to disclosure herein. FIG. 8B illustrates a parallel projection plan view of tapered waveguide structure 148, discussed elsewhere herein. FIGS. 8A and 8B are discussed together. Tapered waveguide 149 and its fabrication are generally similar to tapered waveguide 148 and its fabrication, discussed above. Tapered waveguide 148 is illustrated in FIG. 8B, next to tapered waveguide 149 to illustrate similarities and differences in embodiments.

Tapered waveguide 148 comprises waveguide overlap area 160, first waveguide 150, and second waveguide 155. First waveguide 150 and second waveguide 155 overlap in waveguide overlap area 160. Along the z axis of waveguide overlap area 160, first waveguide top plan 168 tapers from x axis width X1 to zero, gradually transitioning the top level of first waveguide 150 down to the top level of second waveguide 155 with a 3D structure which provides low transmission losses for electromagnetic radiation transmitted between first waveguide 150 and second waveguide 155. As illustrated and discussed, second waveguide 155 may comprise a second taper between waveguide overlap area 160 and a terminus of tapered waveguide 148, such that the width of second waveguide at the terminus of tapered waveguide 148 is width X2. As discussed, this second taper is an embodiment, but is not necessarily required. Pair of dotted lines 170 in FIG. 8B are width X1, apart.

Tapered waveguide 149 comprises waveguide overlap area 165, first waveguide 176, and second waveguide 177. First waveguide 176 and second waveguide 177 overlap in waveguide overlap area 165. Along the z axis of waveguide overlap area 165, a first waveguide top plan of first waveguide 176 tapers from x axis width X1 to zero, gradually transitioning the top level of first waveguide 176 down to the top level of second waveguide 177 with a 3D structure which provides low transmission losses for electromagnetic radiation transmitted between first waveguide 176 and second waveguide 177. This 3D structure is also illustrated in FIG. 9A.

In FIG. 8A, pair of dotted lines 175 are an x axis width apart which is greater than X1. Second waveguide 177 increases in width, from width X1 to the width greater than X1, across the y axis of waveguide overlap area 165. This inverse taper may be inversely proportional to the taper of first waveguide top plan of first waveguide 176, as the first waveguide top plan of first waveguide 176 tapers from x axis width X1 to zero. The inverse taper does not have to be inversely proportional; a proportional inverse taper may provide optical or other benefits. As illustrated in FIG. 8A, second waveguide 177 may comprise a second taper between, for example, an end of waveguide overlap area 165 and a terminus of tapered waveguide 149. As discussed in relation to tapered waveguide 148, this second taper is an embodiment, though is not required.

FIG. 9A illustrates a perspective view of tapered waveguide 149 of FIG. 8A. FIG. 9B illustrates a perspective view of tapered waveguide 148 of FIG. 8B. FIGS. 9A and 9B are provided to avoid any confusion regarding the structures of tapered waveguide 149 and 148.

Figure 10A:
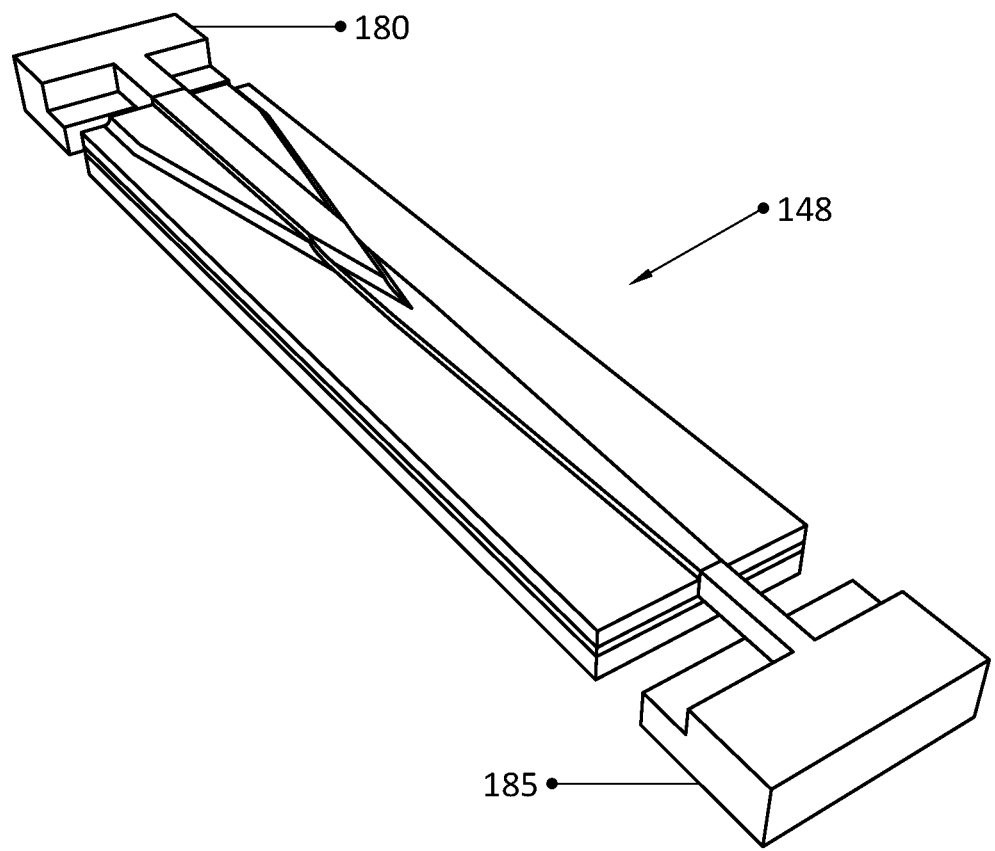
FIG. 10A is a first perspective view of a waveguide structure optically coupled to two different size photonic devices.
Figure 10B:
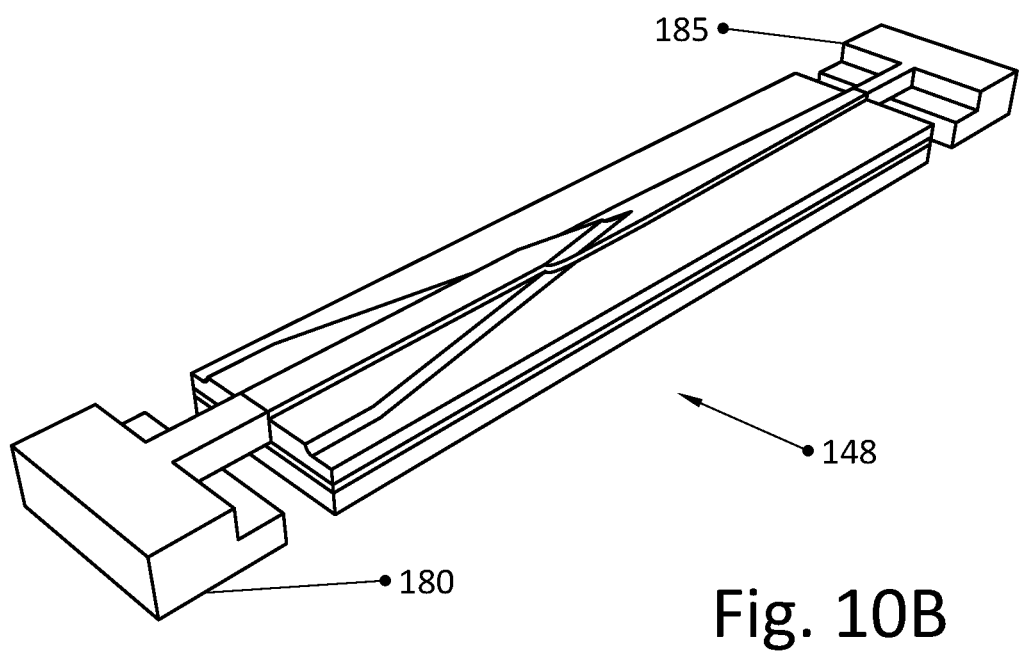
FIG. 10B is a second perspective view of the waveguide structure optically coupled to two different size photonic devices of FIG. 10A.

FIG. 10A is a first perspective view of tapered waveguide 148 optically coupled to photonic device 180 and photonic device 185. FIG. 10B is a second perspective view of tapered waveguide 148 optically coupled to photonic device 180 and photonic device 185. FIGS. 10A and 10B illustrate that photonic devices 180 and 185 may be optically and/or electronically and/or physically coupled to tapered waveguide 148 and that photonic devices 180 and 185 may be of different sizes. Optical coupling of photonic devices 180 and 185 to a tapered waveguide does not require that the photonic devices physically contact the tapered waveguide (as illustrated). Optical coupling may be across a gap; the gap may comprise a vacuum, a gas, a liquid, or a transmissive solid (a transparent or at least partially transparent solid).

With respect to FIG. 11, optical coupling of a tapered waveguide to photonic device(s) may occur at block 1130.

FIG. 11 is a flow diagram illustrating an example of a process 1100 to fabricate a 3D tapered waveguide, according to some embodiments. At block 1101 of process 1100, a tapered oxidation mask may be applied to and/or positioned above an epitaxial film, such as an epitaxial film of silicon. As noted, the composition of such an oxidation mask may be, for example, silicon nitride, a rigid mask, or the like. The tapered oxidation mask may taper from one end to another. Application of the oxidation mask may be a multistep process.

At block 1105, an oxidation process may be performed to oxidize the epitaxial film, where not protected by the oxidation mask. The oxidation process may be isotropic. The oxidation process may be a thermal oxidation process, including wet and/or dry processes. The resulting oxidation layer may penetrate below and beneath the oxidation mask. The depth of the oxidation layer may depend on a length of time, pressure or concentration of material, and/or temperature. The resulting oxidation layer may extend up from an original surface of epitaxial film, relative to the level of such surface prior to oxidation. The resulting oxidation layer is patterned, generally following the outline of the tapered oxidation mask. The resulting oxidation layer may also be referred to herein as a "patterned oxidized volume".

At block 1110, the oxidation mask and patterned oxidized volume may be removed from the epitaxial film. The oxidation mask and patterned oxidized volume may be removed by a process such as, for example, a wet etch process. The wet etch process may be isotropic. An example of a wet etch process is a wet etch process with BHF. The removal process may preferentially remove silicon dioxide and/or the oxidation mask, relative to silicon. Removal of the oxidation mask and patterned oxidized volume may leave an elevated structure, with a top level at or near the original top level of the epitaxial film. The elevated structure may comprise the material of the epitaxial film. The top level of the epitaxial film where the patterned oxidized volume was removed may be referred to herein as a first etch level (it being understood that many other etch processes may precede the process which removes the oxidation mask and patterned oxidized volume).

At block 1115, a mask may be applied to a band along the surface of the epitaxial film. The band may lay along a portion of the elevated structure as well as on the first etch level. A width of an outline of the band may correspond to an intended width of a top level of a waveguide or waveguides to be fabricated in the epitaxial film. The width of the band may vary across its length. The mask applied to the band may be, for example, a photolithographic mask or another suitable mask. Application of the band of mask may be a multistep process, in which a mask material or mask pre-cursor is applied (including by spin coating), prebaked, exposed to a pattern corresponding to the band, and material removed to leave the band. Other processes may be followed, such as contact printing, proximity printing, and/or projection printing.

At block 1120, the epitaxial film may be etched with an etch process. The etch process may be a plasma etch process, also known as a dry etch process. The etch process may be anisotropic, preferentially removing material along one axis, without or with less material removal along a perpendicular axis. An anisotropic wet etch process may also or alternatively be used. The mask of block 1115 may protect a portion of the epitaxial film.

At block 1125, the mask of block 1115 may be removed. Removal of the mask may be by wet stripping, such as by application of an organic or inorganic solvent, or dry (plasma) stripping. Removal of the mask may leave a 3D tapered waveguide, with at least two waveguides which overlap in a waveguide overlap region, and wherein the two waveguides have at least a different height, if not also a different width. One of the two waveguides may reduce in height across a gradual taper, which minimizes transmission losses between the two waveguides.

At block 1130, the tapered waveguide structure of block 1125 may be optically coupled to one or more photonic devices. For example, a source of electromagnetic radiation may be optically coupled to one end of the tapered waveguide structure, while a receiver of electromagnetic radiation may be optically coupled to the other (or another) end of the tapered waveguide structure. The source and receiver may be of different sizes, with the different sizes accommodated by the tapered waveguide structure.

At block 1199, process 1100 may conclude and/or return to another process.

Many other procedures may be employed in addition to or instead of those described herein, such as pre- and postbake processes, processes to remove or reduce the effect of standing waves, application of bottom anti-reflective coatings, substrate preparation, doping, and the like.

In various implementations, a 3D tapered waveguide structure according to the disclosure herein may be used in a computer device, in a communications device, or the like.

Following are examples:

EXAMPLE 1

A waveguide transition structure, comprising: a first waveguide comprising a first waveguide top plain on an first level, wherein the first waveguide top plain has a width X; a second waveguide comprising a second waveguide top plain on a level adjacent to the first waveguide top plain; wherein, the first and second waveguides overlap in a waveguide overlap area; and the first waveguide top plain comprises a taper across the waveguide overlap area, wherein the taper reduces the width X to zero.

EXAMPLE 2

The structure according to Example 1, wherein the first and second waveguides are formed in one continuous epitaxial silicon film on a silicon dioxide substrate.

EXAMPLE 3

The structure according to Example 2, wherein the epitaxial silicon film comprises a crystalline lattice, wherein the crystalline lattice comprises at least one crystalline lattice axis perpendicular to an axis of propagation of electromagnetic radiation through the first and second waveguides.

EXAMPLE 4

The structure according to any one or more of Example 1 to Example 3, wherein the width X is perpendicular to an axis of propagation of electromagnetic radiation through the first and second waveguides.

EXAMPLE 5

The structure according to any one or more of Example 1 to Example 4, further comprising at least one of a first transmitter or receiver optically coupled to the first waveguide or a second transmitter or receiver optically coupled to the second waveguide.

EXAMPLE 6

The structure according to any one or more of Example 1 to Example 5, wherein a width of the second waveguide top plain is one of constant across a length of the taper or increases as the taper reduces the width X to zero.

EXAMPLE 7

The structure according to Example 6, wherein the width of the second waveguide top plain increases in parallel to a reduction in the taper as the taper reduces the width X to zero.

Example 8

The structure according to any one or more of Example 1 to Example 7, wherein the second waveguide comprises a second waveguide taper, wherein the second waveguide taper reduces a width of the second waveguide before an optical couple to a transmitter or receiver and wherein the second waveguide taper begins after the waveguide overlap area.

Example 9

A method of fabricating a waveguide structure, comprising: removing a patterned oxidized volume from an epitaxial film to leave an elevated structure on the epitaxial film, wherein the elevated structure tapers from a first width to zero across a waveguide overlap area, wherein the first width is equal to or greater than a width X; applying a mask to a band along a surface of the epitaxial film, wherein the band along the surface of the epitaxial film comprises a portion of the elevated structure above the waveguide overlap area; etching the surface of the epitaxial film to remove a volume of the epitaxial film not protected by the mask; removing the mask to leave a first waveguide comprising a first waveguide top plain with the width X and a second waveguide comprising a second waveguide top plain on a level below the first waveguide top plain; wherein the first and second waveguides overlap in the waveguide overlap area and the first waveguide top comprises a taper across the waveguide overlap area, wherein the taper reduces the width X to zero across the waveguide overlap area.

EXAMPLE 10

The method according to Example 9, further comprising selectively oxidizing the epitaxial film to form the patterned oxidized volume.

EXAMPLE 11

The method according to Example 10, wherein selectively oxidizing comprises applying a tapered oxidation mask to the epitaxial film and oxidizing the epitaxial film.

EXAMPLE 12

The method according to Example 11, wherein the tapered oxidation mask comprises at least one of a silicon nitride mask chemically bonded to the epitaxial film or a rigid mask and oxidizing the epitaxial film comprises at least one of thermally oxidizing the epitaxial film or performing chemical vapor deposition of oxide.

EXAMPLE 13

The method according to any one or more of Example 9 to Example 12, wherein the mask is a photolithographic mask.

EXAMPLE 14

The method according to any one or more of Example 9 to Example 13, wherein at least one of removing the patterned oxidized volume or etching the surface of the epitaxial film comprises at least one of a dry etch process or a wet etch process.

EXAMPLE 15

The method according to Example 14, wherein removing the patterned oxidized volume comprises removing the patterned oxidized volume with the wet etch process and wherein etching the surface of the epitaxial film comprises the dry etch process.

EXAMPLE 16

The method according to any one or more of Example 14 to Example 15, wherein the dry etch process is anisotropic and the wet etch process is isotropic.

EXAMPLE 17

The method according to any one or more of Example 9 to Example 16, wherein etching the surface of the epitaxial film to remove the volume of the epitaxial film not protected by the mask comprises etching the surface of the epitaxial film to uniformly remove the volume of the epitaxial film not protected by the mask.

EXAMPLE 18

The method according to any one or more of Example 9 to Example 17, further comprising optically coupling a first transmitter or receiver to the first waveguide and a second transmitter or receiver to the second waveguide.

EXAMPLE 19

The method according to any one or more of Example 9 to Example 18, wherein a width of the second waveguide top plain inside of the waveguide overlap area is one of i) constant across a length of the taper or ii) increases as the taper reduces the width X to zero and decreases outside of the waveguide overlap area to less than the width X.

EXAMPLE 20

An optical system comprising: a waveguide transition structure, wherein the waveguide transition structure comprises a first waveguide and a second waveguide; a first transmitter or receiver of electromagnetic radiation optically coupled to the first waveguide and a second transmitter or receiver of electromagnetic radiation optically coupled to the second waveguide; wherein the first waveguide comprises a first waveguide top plain on an first level, wherein the first waveguide top plain has a width X; a second waveguide comprising a second waveguide top plain on a level adjacent to the first waveguide top plain; wherein, the first and second waveguides overlap in a waveguide overlap area; and the first waveguide top plain comprises a taper across the waveguide overlap area, wherein the taper reduces the width X to zero.

EXAMPLE 21

The system according to Example 20, wherein the first and second waveguides are formed in one continuous epitaxial silicon film on a silicon dioxide substrate.

EXAMPLE 22

The system according to Example 21, wherein the epitaxial silicon film comprises a crystalline lattice, wherein the crystalline lattice comprises at least one crystalline lattice axis perpendicular to an axis of propagation of electromagnetic radiation through the first and second waveguides.

EXAMPLE 23

The system according to any one or more of Example 20 to Example 22, wherein the width X is perpendicular to an axis of propagation of electromagnetic radiation through the first and second waveguides.

EXAMPLE 24

The system according to any one or more of Example 20 to Example 23, wherein a width of the second waveguide top plain is one of constant across a length of the taper or increases as the taper reduces the width X to zero.

EXAMPLE 25

The system according to Example 24, wherein the width of the second waveguide top plain increases in parallel to a reduction in the taper as the taper reduces the width X to zero.

EXAMPLE 26

The system according to any one or more of Example 20 to Example 25, wherein the second waveguide comprises a second waveguide taper, wherein the second waveguide taper reduces a width of the second waveguide before the second transmitter or receiver and wherein the second waveguide taper begins after the waveguide overlap area.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

What is claimed is:

1. A waveguide transition structure, comprising:
a first waveguide with a first thickness extending along the waveguide transition structure from a first end of the waveguide transition structure, wherein the first waveguide has a first width;
a second waveguide with a second thickness different from the first thickness extending from a second end of the waveguide transition structure opposite the first end;
wherein the first waveguide is in a first plane and the second waveguide is in a second plane parallel to the first plane;
wherein the first waveguide and the second waveguide are adjacent and overlap in a transition area; and
wherein the first waveguide's first thickness transitions to the second thickness in the transition area.

2. The structure according to claim 1, wherein the first and second waveguides are formed in one continuous epitaxial silicon film.

3. The structure according to claim 2, wherein the one continuous epitaxial silicon film is on a silicon dioxide substrate.

4. The structure according to claim 2, wherein the epitaxial silicon film comprises a crystalline lattice, wherein the crystalline lattice comprises at least one crystalline lattice axis perpendicular to an axis of propagation of electromagnetic radiation through the first and second waveguides.

5. The structure according to claim 1, wherein the first waveguide's first width is X and is perpendicular to an axis of propagation of electromagnetic radiation through the first and second waveguides.

6. The structure according to claim 1, further comprising at least one of a first transmitter or receiver optically coupled to the first waveguide or a second transmitter or receiver optically coupled to the second waveguide.

7. The structure according to claim 1, wherein a width of the second waveguide is constant across a length of a taper in the transition area.

8. The structure according to claim 5, wherein a width of the second waveguide increases in parallel to a reduction in a first taper as the first taper reduces the width X to zero.

9. The structure according to claim 5, wherein a width of the second waveguide increases as a first taper reduces a first width to zero.

10. The structure according to claim 1, wherein the second waveguide comprises a second waveguide taper;
wherein the second waveguide taper reduces a width of the second waveguide before an optical couple to a transmitter or receiver; and
wherein the second waveguide taper begins after the waveguide transition area.

11. The waveguide transition structure of claim 1, wherein a surface of the first waveguide or the second waveguide is a selected one of a planar surface or a curved surface.

12. An optical system comprising:
a waveguide transition structure having a first waveguide and a second waveguide, wherein the first waveguide and the second waveguide overlap in a transition area, and wherein in the transition area, the first waveguide has a first dimension in a first direction that tapers in the transition area, or a second dimension in a second direction that transitions to a third dimension of the second waveguide in the second direction;
a first transmitter or receiver of electromagnetic radiation optically coupled to the first waveguide;
a second transmitter or receiver of electromagnetic radiation optically coupled to the second waveguide; and
wherein the first waveguide's first thickness transitions to a second thickness in the transition area.

13. The system according to claim 12, wherein the first and second waveguides are formed in one continuous epitaxial silicon film.

14. The system according to claim 13, wherein the one continuous epitaxial silicon film is on a silicon dioxide substrate.

15. The system according to claim 13, wherein the epitaxial silicon film comprises a crystalline lattice, wherein the crystalline lattice comprises at least one crystalline lattice axis perpendicular to an axis of propagation of electromagnetic radiation through the first and second waveguides.

16. The system according to claim 12, wherein a width X of the first waveguide or the second waveguide is perpendicular to an axis of propagation of electromagnetic radiation through the first and second waveguides.

17. The system according to claim 16, wherein a width of the second waveguide is constant across a length of the taper.

18. The system according to claim 16, wherein a width of the second waveguide increases as the taper reduces the width X to zero.

19. The system according to claim 12, wherein the second waveguide comprises a second waveguide taper, wherein the second waveguide taper reduces a width of the second waveguide before the second transmitter or receiver and wherein the second waveguide taper begins after the transition area.

20. The system of claim 12, wherein a surface of the first waveguide or the second waveguide is a selected one of a planar surface or a curved surface.

\* \* \* \* \*